United States Patent [19]

Lemmerman et al.

[11] Patent Number: 5,031,780
[45] Date of Patent: Jul. 16, 1991

[54] SLOT-WALL SHELF FOR VIDEO CASSETTE DISPLAY

[75] Inventors: Marvin C. Lemmerman, Renton; Robert J. Petersen, Mercer Island, both of Wash.

[73] Assignee: Innovative Display Associates, Inc., Renton, Wash.

[21] Appl. No.: 533,690

[22] Filed: Jun. 6, 1990

Related U.S. Application Data

[63] Continuation-in-part of Ser. No. 446,402, Dec. 5, 1989, and a continuation-in-part of Ser. No. 270,391, Nov. 10, 1988, Pat. No. 4,971,206, and a continuation-in-part of Ser. No. 71,350, Jul. 9, 1987, abandoned.

[51] Int. Cl.[5] .............................................. A47B 63/00
[52] U.S. Cl. ....................................... 211/41; 211/135; 211/94
[58] Field of Search ................... 211/41, 42, 88, 71, 211/134, 135, 94, 13, 162; 206/387; 312/9, 10, 15, 17

[56] References Cited

U.S. PATENT DOCUMENTS

| | | | |
|---|---|---|---|
| 408,001 | 7/1889 | Dunn | 211/135 X |
| 887,631 | 5/1908 | Hawthorne | 312/10 |
| 2,018,085 | 10/1935 | Otte | 211/135 X |
| 3,138,261 | 6/1964 | Witteborg | 211/41 |
| 3,502,290 | 3/1970 | Legrand et al. | 248/916 X |
| 3,861,326 | 1/1975 | Brown | 108/51 |
| 3,951,078 | 4/1976 | Fowler et al. | 108/51 |
| 4,131,203 | 12/1978 | Bridges | 211/88 |
| 4,159,681 | 7/1979 | Vandament | 108/51.1 |
| 4,211,379 | 7/1980 | Morgan et al. | 248/222.2 |
| 4,240,557 | 12/1980 | Dickens | 211/153 |
| 4,257,524 | 3/1981 | Yonkers et al. | 211/71 |
| 4,572,381 | 2/1986 | Breakley et al. | 211/94 |
| 4,573,588 | 3/1986 | Cohen | 211/41 |
| 4,584,950 | 4/1986 | Adams et al. | 211/41 |
| 4,615,448 | 10/1986 | Johnstonbaugh | 211/94 |
| 4,629,076 | 12/1986 | Amstutz et al. | 211/94 |
| 4,684,027 | 8/1987 | Wright | 211/40 |

Primary Examiner—Alvin C. Chin-Shue
Assistant Examiner—Sarah A. Lechok
Attorney, Agent, or Firm—Christopher John Rudy

[57] ABSTRACT

Improved display module has at least one opening in a wall that would otherwise define a recess for insertion of a display object, e.g., a video cassette.

20 Claims, 5 Drawing Sheets

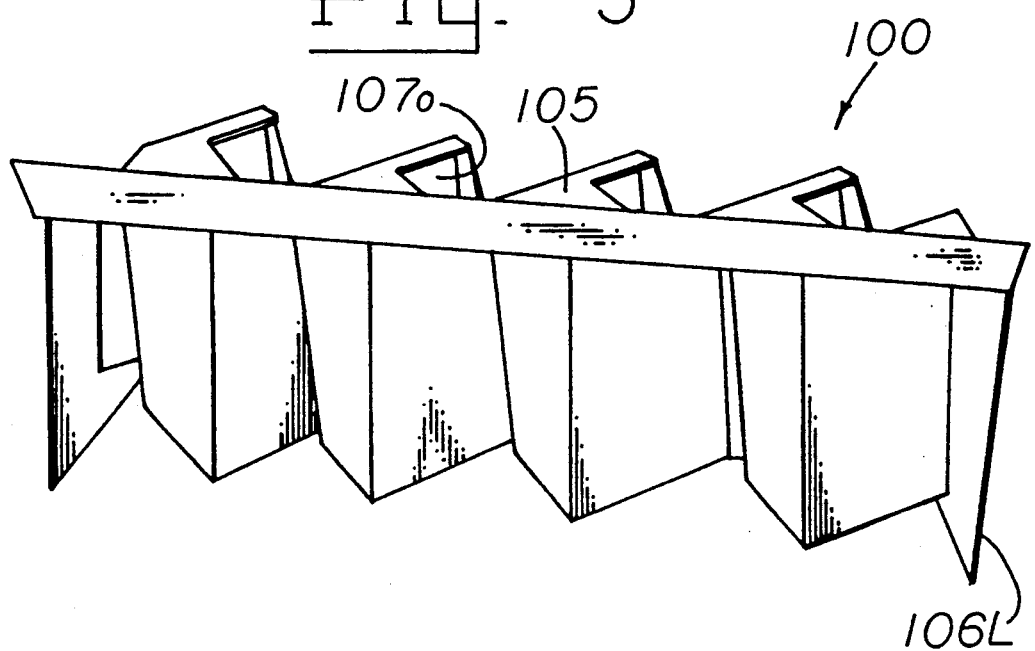
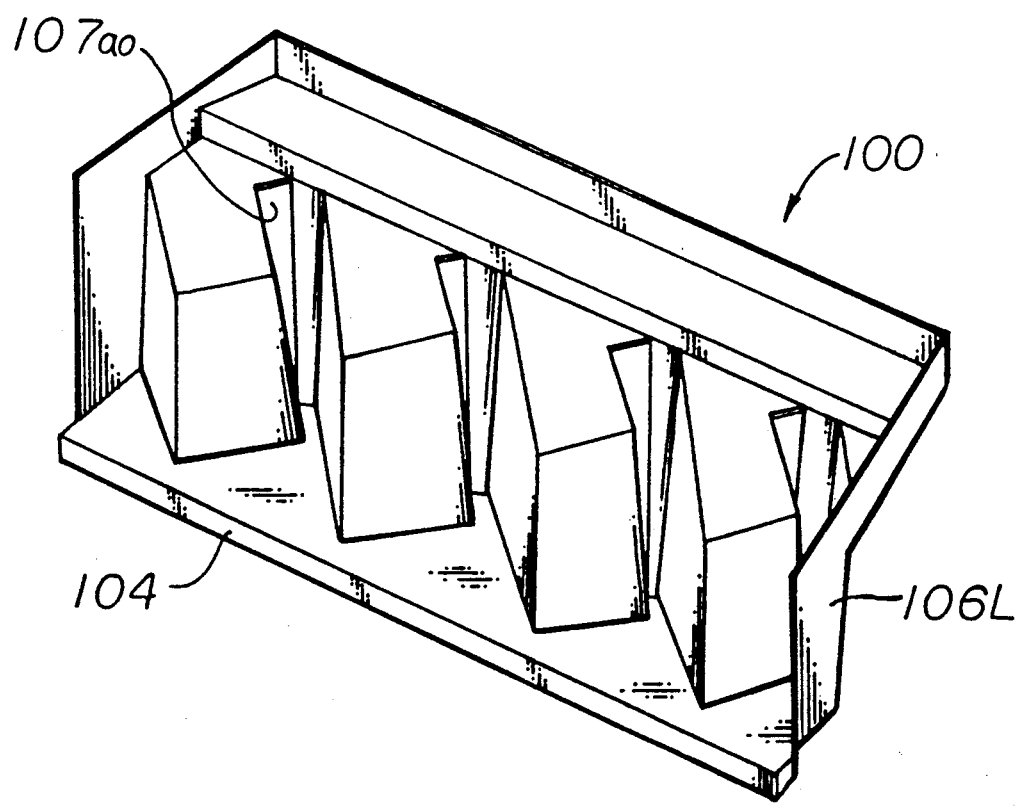

SLOT-WALL SHELF FOR VIDEO CASSETTE DISPLAY

This is a continuation-in-part of U.S. Pat. application Ser. Nos. 07/446,402 filed Dec. 5, 1989 and 07/270,391 now U.S. Pat. No. 4,971,206 filed Nov. 10, 1988, the former being a design and continuation-in-part of the latter, and the latter being a continuation of U.S. Pat. application Ser. No. 07/071,350 filed July 9, 1987, abandoned. Said Ser. No. 07/446,402 generally corresponds to a Canadian Industrial Design Application filed Apr. 26, 1990 with the same title hereof; said Ser. No. 07/270,391 generally corresponds to Canadian Patent Application No. 586,620-1 filed Dec. 21, 1988 and to Canadian Industrial Design Application No. 21-12-88-4 filed Dec. 21, 1988 which is Registration No. 64226 issued Sept. 14, 1989. Each of the foregoing is incorporated herein by reference.

FIELD & SUMMARY

The present invention concerns and provides a bimodal display module for displaying video cassette containers and like objects. It can comprise:

body means forming an elongated upright recess having at least one open end for insertion of a display object and an opening where at least one wall would otherwise in part define the recess, elongated generally horizontal tray means extending at an oblique angle to said recess at substantially the same elevation thereof adjacent said at least one open end, and means forming at least one upright support adjacent said at least one open end, said upright support means being located in a plane extending parallel with the longitudinal axis of said tray means and substantially normal to the plane of said tray means, such that a display object can be inserted into said recess and extend across said tray means at an oblique angle thereto in a first display position or be placed on said tray means and supported against said upright support means in a second display position, wherein at least one stop means, extending upwardly on said tray means and spaced from said upright support means for contacting a bottom edge of the display object to retain the display object on said tray means in the second display position, is present.

This invention is useful for video cassette display.

Notably, this invention is a significantly great advance in the art, particularly with respect to the video cassette display module for slot-wall merchandising or display module of the appropriate earlier applications. It generally features in the module the opening where at least one wall would otherwise in part define the recess. This provides for greater ease and lower cost of manufacture, lighter weight, increased strength where such another earlier module would often break, and a uniquely satisfying visual appeal to retailers and consumers alike, advantageous in the commercial success hereof.

Further advantages attend this invention as well.

DRAWINGS

The drawings form part of the specification hereof.

FIG. 5 (FIG. 5) is an oblique perspective view, generally from the back, side, of the obverse of the module of FIG. 1.

FIG. 6 (FIG. 6) is an oblique perspective view, generally from the side, of the reverse of the module of FIG. 1.

ILLUSTRATIVE DETAIL

In general, the present invention is an improvement in such modules as the video cassette display module for slot-wall merchandising of U.S. Ser. Nos. 07/071,350 & 07/270,391 and Cdn. Appl. No. 586,620-1 and the display module of Cdn. Rd 64226. Most notably, the improvement includes in such a module the opening where at least one wall would otherwise in part define the noted recess thereof. Preferably, the opening spans and envoids the area where a wall, acutely angled in relation to upright support means, and part of a wall, a rearward wall, adjacent to the acutely angled envoided area, would otherwise be located. Further improvements attend this invention as well.

The present module can be made by known methods. Injection molding is preferred.

In reference to the drawings, the following is noted. Of course, the dimensions and features noted are exemplary and may be varied herein as may be appropriate.

The preferred embodiment hereof 100 is formed of a suitable injection molded plastic, e.g., crystal polystyrene, with a wall thickness of 0.075 inches (0.19 cm), an overall height of 3.76 inches (9.55 cm), an overall width of 11.26 inches (28.6 cm) and an overall depth of 3.925 inches (9.97 cm). Overall from its base to its top, the module unit slims by 3 degrees from the perpendicular on both sides, facilitating extraction of the unit from the mold during production as is known in the art.

Figure 9:
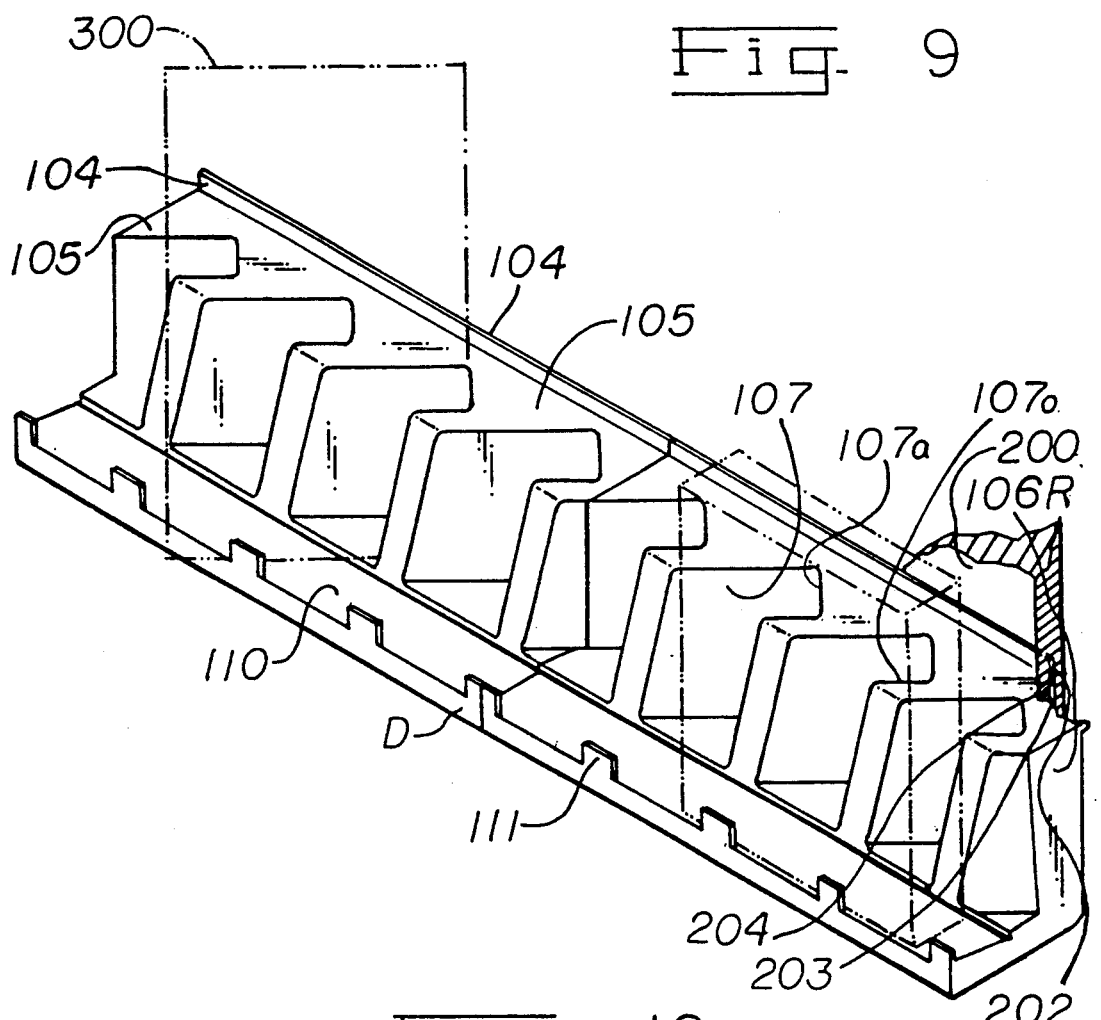
FIG. 9 (FIG. 9) is a perspective view of the module of FIG. 1 mounted on a vertical surface of slot-wall.

On a plane with uppermost horizontal surface 105 of the module and extending straight back 0.25 inches (0.635 cm) is appendage 104, which turns up pendicularly for 0.46 inches (1.17 cm). This appendage transverses the full width of the unit at this point and interengages with slot 204 in the vertical merchandising panel of slot-wall 200. See, FIG. 9. A vertical portion of this appendage extends upward behind upper lip 202 of the slot, preventing forward movement of the module. A horizontal portion of this appendage rests on top of lower lip 203 of the slot and supports weight of the unit. From the point where this appendage meets with the main body of the module and covering entirely that plane of the unit one would refer to as its side, right side surface 106R is formed, which reinforces and helps stabilize the module. Rear vertical edge 106r of this right side surface provides support as it rests against the vertical surface of the merchandising panel when in use. Likewise, left side surface 106L is formed and includes a rear vertical edge (not shown) for the same purpose.

Figure 10:
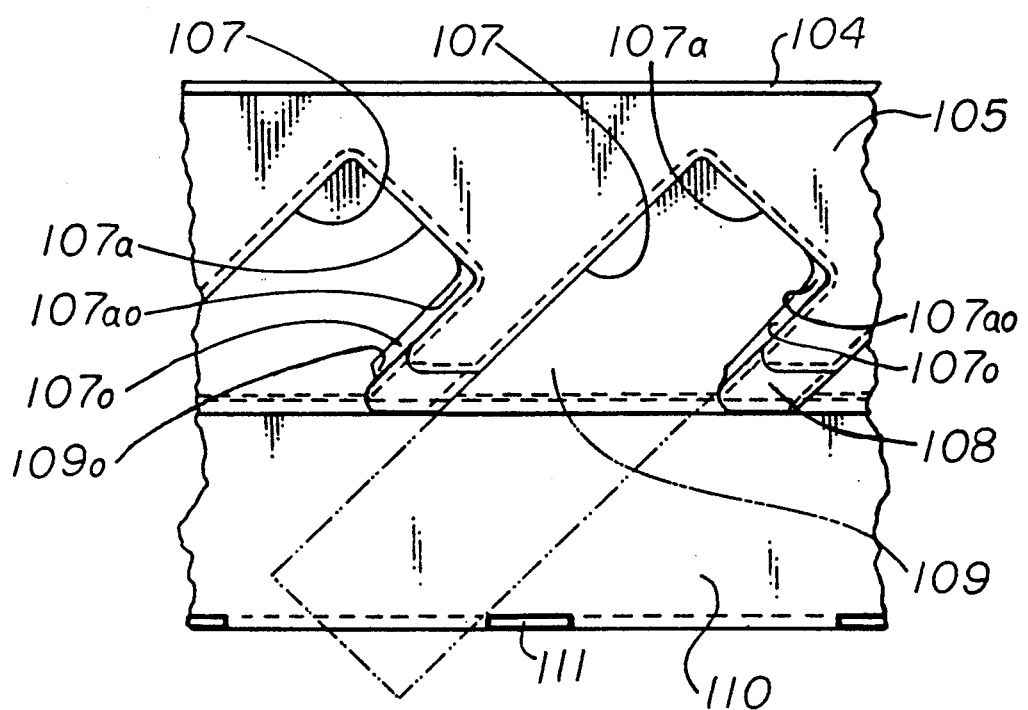
FIG. 10 (FIG. 10) is a top plan view of the module of FIG. 1

The uppermost horizontal surface 105 extends forward from the slot-engaging appendage 104 on a plane from whence it cascades downward, forming vertical walls defining recesses 113, which are at 45 degrees from the back and front of the module unit. At forward points, where the angle of descent is 3 degrees less than perpendicular, the cascade creates inclined surface 108 against which video cassette 300 can be propped as shown in phantom in FIG. 9. In general, the large, oblique recesses have perpendicular first wall 107, perpendicular back wall portion 107a, back opening portion 107ao in lieu of where an extension of the perpendicular back wall portion would otherwise in part have defined the recess, and substantially full opening 107o in lieu of where another perpendicular wall opposite the perpendicular first wall would otherwise in part have defined the recess. This first wall is generally at 90 degrees to this back wall portion and a plane in general defining this back opening portion, and this back wall portion and the plane in general defining this back opening portion is generally at 90 degrees to a plane generally defining this substantially full opening. These back portion and substantially full openings connect to form one orifice. The recess, which again tapers slightly to facilitate its ejection from the mold, is 1.57 inches (3.99 cm) wide at its bottom and 1.75 inches (4.44 cm) wide at its top, operatively thus being about 1.75 inches (4.44 cm) wide, from the first wall to the plane generally defining this substantially full opening and is designed to accommodate the display of video cassette 300a as shown in phantom in FIG. 9. Further contributing to this task are buttress tabs 111 located where the planes of the first and back partial perpendicular walls intersect with plane D, which forms the front wall of the module. These buttress tabs help position and stabilize the video cassette in the recess for display purposes as shown in FIG. 10. The edge of the unit between these buttress tabs and bottom wall 109 between the first and back partial perpendicular walls lies on a common horizontal plane and forms the supporting floor upon which the displayed objects can rest. An opening 109o in a portion of the bottom wall supporting floor in the recess and next to the back opening portion and the substantially full opening connects with and is a part of the one opening formed with the back portion and substantially full openings. The rowed sequence of these buttress tabs along the upper forward edge of the module serve a dual purpose:
1) When a video cassette is displayed in a face out position, these tabs serve as guard rails for the product.
2) When a video cassette is displayed obliquely, these tabs serve as spacers with their outer edges stabilizing the cassette on the leading edge of the recess.
See, FIGS. 9 & 10.

To appreciate the positioning of the recesses in each module, it may be helpful to visualize a contiguous row of these oblique display recesses and then to dissect the row at right angles at points so placed as to allow, off-centered between the two lines of dissection, a combined cassette display lying obliquely from back to front as may be seen in FIG. 10. To the right extremity and to the left extremity of a complete module is located one-half of another recess complimentary with its inward neighbor, either the rear half or the forward half, which finds its functional other half by crossing the line of row dissection. These dissection lines are indicated as E & F. Thus, the units are modular in that each unit can contribute to the function of its neighbor in such a way as to increase the display capacity of a single unit when it is used in conjunction with other unit(s) placed at its right and/or left.

Figure 1:
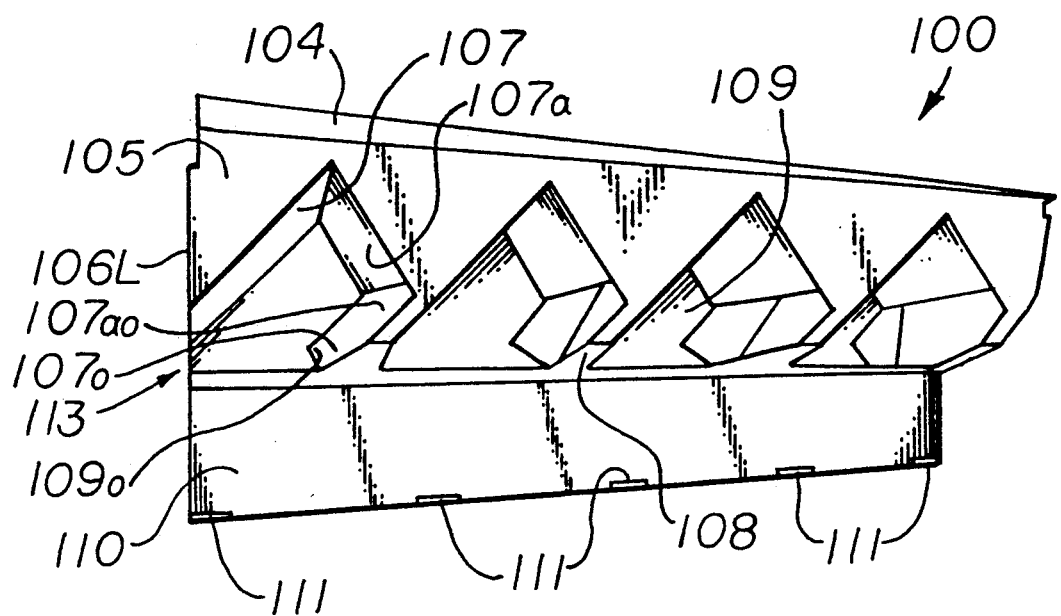
FIG. 1 (FIG. 1) is an oblique perspective view, generally from the front, nearly from the top, left, of the obverse of a module of the present invention.
Figure 2:
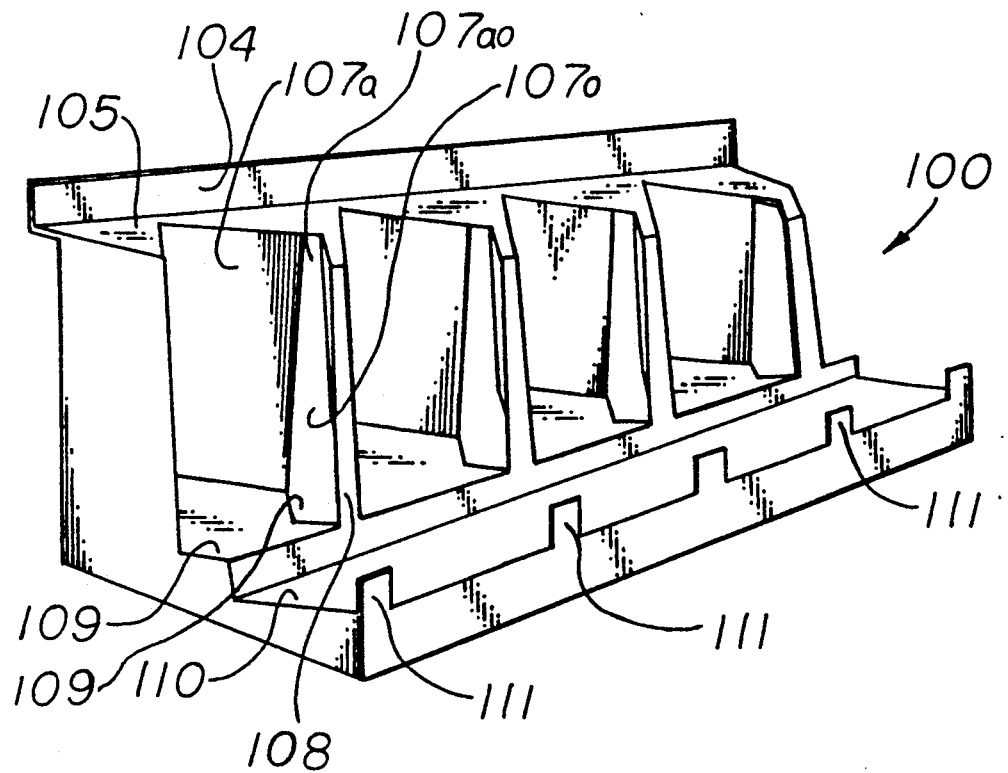
FIG. 2 (FIG. 2) is an oblique perspective view, generally from the front, side, left, of the obverse of the module of FIG. 1.
Figure 3:
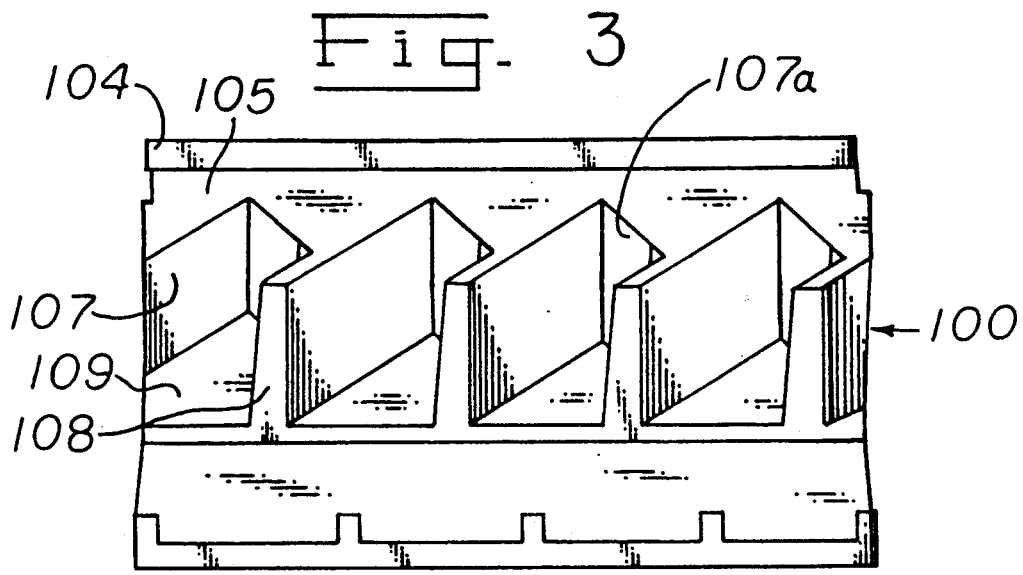
FIG. 3 (FIG. 3) is an oblique perspective view, generally from the front, side, of the obverse of the module of FIG. 1.
Figure 4:
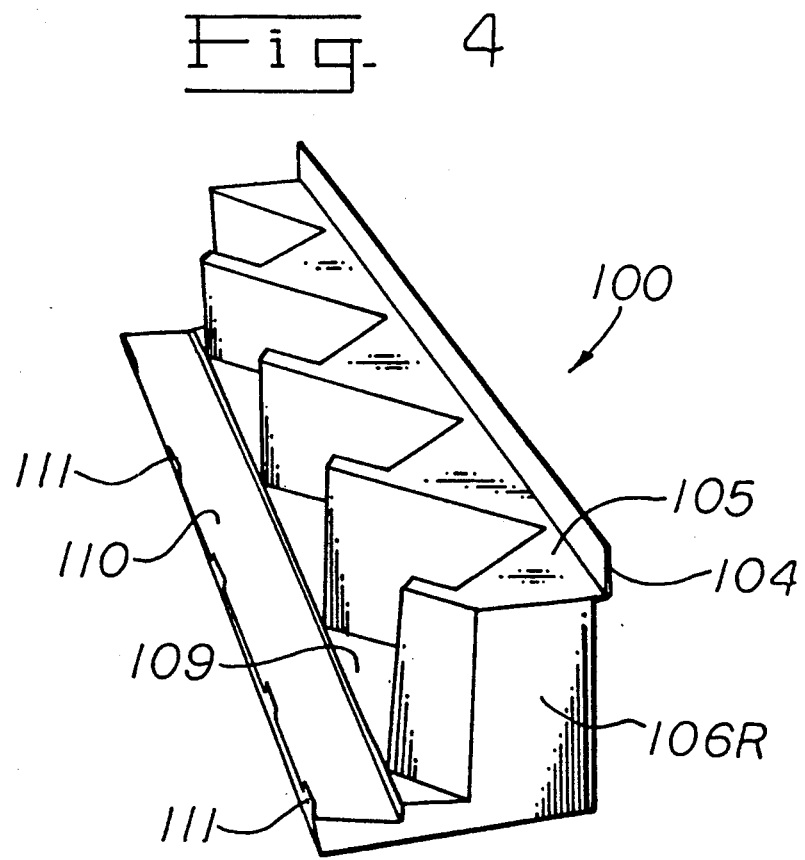
FIG. 4 (FIG. 4) is an oblique perspective view, generally from the front, side, right, of the obverse of the module of FIG. 1.
Figure 7:
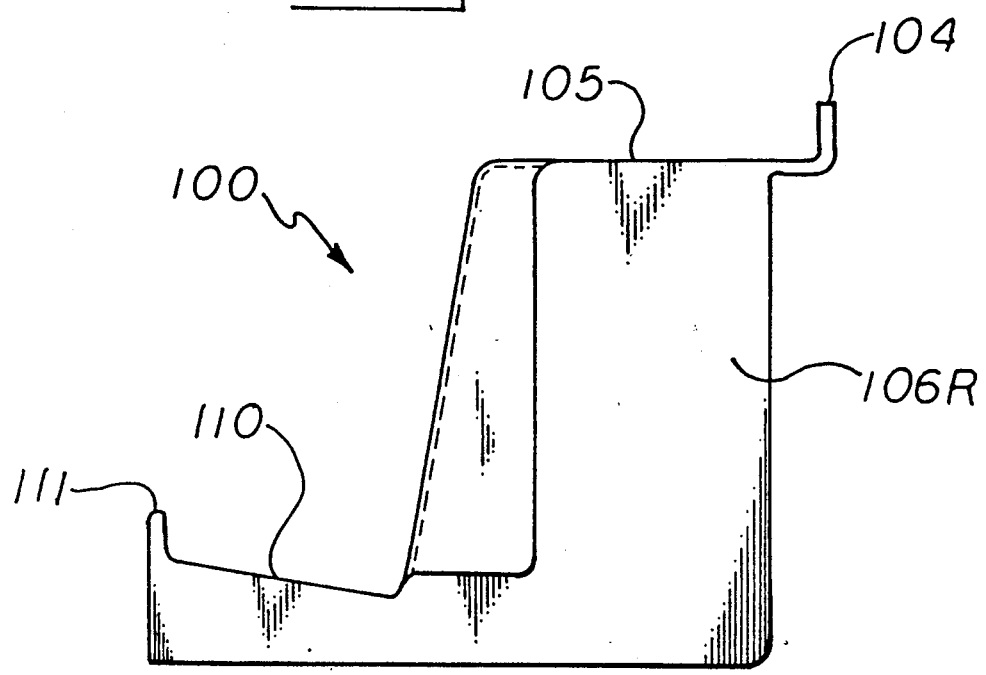
FIG. 7 (FIG. 7) is a right side view in elevation of the obverse of the module of FIG. 1.
Figure 8:
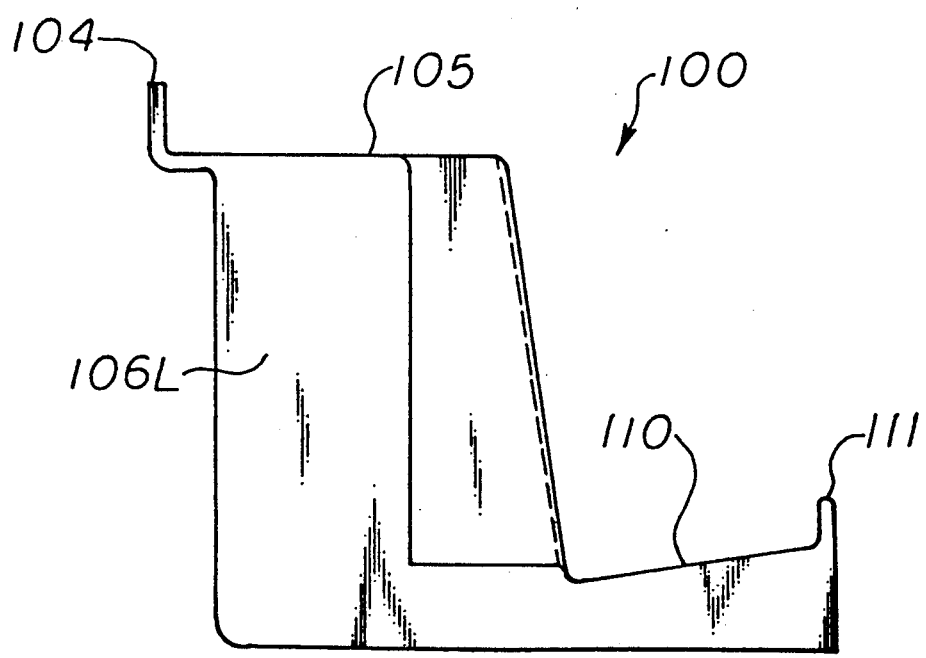
FIG. 8 (FIG. 8) is a left side view in elevation of the obverse of the module of FIG. 1.

Transversing the front portion of the module 100 is a tray 110 measuring 1.625 inches (4.13 cm) in depth. The floor of the tray is tilted 3 degrees from horizontal so that the plane of its surface is at a right angle to the cascading bulwark, i.e., inclined surface 108. This tray forms a face-out display position for a video cassette, and the tilt makes it so that the cassette can lean into the unit and not fall forward. See, FIGS. 7-9.

The module may be made in mirror image forms, right and left handed versions. However, it is typically found in one version, e.g., the left handed version, according to the current fashion in video cassette merchandising.

The present module can be manufactured more easily and with lower cost, can have lighter weight and increased strength where such another earlier module otherwise made of the same material, e.g., the crystal polystyrene, and having appropriately correspondent known features, would often break. It also has a uniquely satisfying visual appeal to retailers and consumers alike.

The present module enjoys commercial success. For example, the exemplary module 100 is presently marketed as the V-CAD video cassette display module available through Innovative Display Associates, Inc., Renton, Wash., U.S.A.

CONCLUSION

The present invention is thus provided. Numerous adaptations and modifications can be effected by those skilled in the art within the spirit of this invention, the scope of which is particularly pointed out by the following distinctly claimed subject matter.

What is claimed is:

1. A bimodal display module for displaying video cassette containers and like objects comprising:
    body means forming an elongated upright recess having at least one open end for insertion of a display object and an opening where at least one wall would otherwise in part define the recess,
    elongated generally horizontal tray means extending at an oblique angle to said recess at substantially the same elevation thereof adjacent said at least one open end, and
    means forming at least one upright support adjacent said at least one open end, said upright support means being located in a plane extending parallel with the longitudinal axis of said tray means and substantially normal to the plane of said tray means,
    such that a display object can be inserted into said recess and extend across said tray means at an oblique angle thereto in a first display position or be placed on said tray means and supported against said upright support means in a second display position, wherein at least one stop means, extending upwardly on said tray means and spaced from said upright support means for contacting a bottom edge of the display object to retain the display object on said tray means in the second display position, is present.

2. The display module of claim 1, adapted for mounting on a vertical slot-wall display panel surface with said tray means extending parallel thereto including attaching means on said body means for engaging retaining means on said slot-wall panel surface to provide vertical and rotational support for said module, said body means having back side surfaces for contacting said slot-wall surface in a wall mounted position.

3. The display module of claim 2, including bottom surfaces on said body means extending in a plane normal to said back side surfaces, such that said module can be supported on a horizontal support surface.

4. The module of claim 3, wherein the opening where at least one wall would otherwise in part define the recess is in a portion of a back wall of the recess connected to a substantially full opening in lieu of where another perpendicular wall opposite a perpendicular first wall would otherwise in part have defined the recess and connected to an opening where at least a portion of a floor would otherwise in part have defined the recess.

5. The display module of claim 2, wherein said stop means are stop tab means having at least one vertical edge thereof aligned with a wall of said recess for aligning the display object in said recess and extending across said tray means in the first display position.

6. The display module of claim 5, wherein the plane of said tray is inclined downwardly toward said recess to hold the display object in a tilted second display position.

7. The module of claim 6, wherein said recess includes a bottom wall inclined downwardly away from said at least one open end, and the edge of said tray means remote from said recess is located in the general plane of said bottom wall, such that the display object in the first display position rests on said bottom wall and the edge of said tray means remote from said recess.

8. The module of claim 7, wherein the opening where at least one wall would otherwise in part define the recess is in a portion of a back wall of the recess connected to a substantially full opening in lieu of where another perpendicular wall opposite a perpendicular first wall would otherwise in part have defined the recess and connected to an opening where at least a portion of a floor would otherwise in part have defined the recess.

9. A bimodal display module for displaying generally narrow rectangular object(s) having a display face such as a video cassette container and the like comprising:
body means having front and rear sides and including means forming an elongated recess with an opening where at least one wall would otherwise in part define the recess and including a bottom support wall and a frontwardly open end of said recess,
at least one generally upright support surface associated with the frontwardly open end of said recess,
an elongated support tray surface extending transversely in front of the at least one generally upright surface and being substantially normal thereto at the general elevation of said bottom wall, the longitudinal axis of said tray surface being disposed at an oblique angle relative to the longitudinal axis of said recess, and
the at least one generally upright support surface located in a plane extending parallel with the longitudinal axis of said tray surface,
such that a generally narrow rectangular display object can be displayed with its bottom resting on the bottom wall of said recess and extending across said tray surface to expose a display face of the generally narrow display object obliquely to the axis of said tray surface and its back side supported against the at least one generally upright support surface,
wherein at least one stop means, extending upright on the front edge of said tray surface remote from the at least one generally upright support surface for retaining said display object on said tray surface in its face-out display position, is present.

10. The display module of claim 9, wherein said stop means are stop tab means, said stop tab means including at least one vertical edge located in the plane of one wall of said recess for aligning said display object in the recess in the oblique display position.

11. The display module of claim 9, wherein said body means includes a first perpendicular side wall and a substantially full opening in lieu of where another perpendicular wall opposite a perpendicular first wall would otherwise in part have defined the recess, to define said recess,
the at least one generally upright support surface being located on the outer edge of one said side walls, and
wherein said stop means are upright stop tab means located along the front edge of said tray surface remote from the at least one generally upright support surface,
said stop tab means having vertical side edges in the planes of said side walls,
such that said stop tab means retain an outer bottom edge of said display object on said tray surface in the face-out display position and serve to align said display object with said walls when in the oblique display position.

12. The display module of claim 11, wherein said tray surface is rearwardly downwardly inclined toward said recess to hold said display object in a rearwardly tilted position against the at least one generally upright support surface in the face-out display position.

13. The display module of claim 12, wherein the bottom wall of said recess is rearwardly downwardly inclined away from said tray surface, and the front edge of said tray surface remote form said recess lies generally in the plane of the bottom wall of said recess.

14. The display module of claim 13, wherein the opening where at least one wall would otherwise in part define the recess is in a portion of a back wall of the recess connected to the substantially full opening in lieu of where another perpendicular wall opposite a perpendicular first wall would otherwise in part have defined the recess and connected to an opening where at least a portion of a floor would otherwise in part have defined the recess.

15. The display module of claim 14, which is made of a polystyrene.

16. A bimodal modular display system for video cassette containers and like objects, composed of a plurality of substantially identical display modules, said modules when assembled end-to-end forming a continuous tray with a plurality of obliquely oriented parallel upright recesses having one end thereof opening into said tray, each said module comprising:
- body means having first and second end walls and wall means defining a first elongated upright recess having at least one open end for insertion of a display object and an opening where at least one wall would otherwise in part define the recess,
- elongated generally horizontally extending tray means reaching between said end walls at an oblique angle to said first recess adjacent the at least one open end,
- said first recess having a full depth recess for accommodating an object to be displayed resting thereon and extending at an oblique angle across said tray,
- said body means further having wall means forming a predefined recess segment on each side of said first recess and adapted to form full recesses in combination with the body means of a substantially identical module placed on either side thereof,
- such that a plurality of said modules may be placed end-to-end to provide a series of oblique display positions or face-out display positions for a plurality of objects in series,
- wherein upright support surfaces, adjacent the open ends of said recesses, are present, said support surfaces extending normal to the plane of said tray and located in a plane extending parallel with the longitudinal axis of said tray, such that an object placed in the face-out display position rests on said tray and is supported in the upright position by said support surfaces,
- and wherein stop tab means on said tray, spaced from said support surfaces, for retaining the object on said tray means in the face-out display position, are present,
- said stop tab means including at least one vertical edge located in the plane of one wall of an associated recess for aligning the objects in said recesses in the oblique display position.

17. The display system of claim 16, adapted for mounting on a vertical slot-wall display panel surface with said tray means extending parallel thereto, wherein each said module includes attaching means on said body means for engaging retaining means on said slot-wall surface to provide vertical and rotational support for the associated module, said body means having back side surfaces for contacting said slot-wall surface in a wall mounted position.

18. The display system of claim 17, wherein the opening where at least one wall would otherwise in part define the recess is in a portion of a back wall of the recess connected to a substantially full opening in lieu of where another perpendicular wall opposite a perpendicular first wall would otherwise in part have defined the recess and connected to an opening where at least a portion of a floor would otherwise in part have defined the recess.

19. The display system of claim 17, including bottom surfaces on said body means extending in a plane normal to said back side surfaces, such that said modules can be supported on a horizontal support surface.

20. The display system of claim 19, wherein the opening where at least one wall would otherwise in part define the recess is in a portion of a back wall of the recess connected to a substantially full opening in lieu of where another perpendicular wall opposite a perpendicular first wall would otherwise in part have defined the recess and connected to an opening where at least a portion of a floor would otherwise in part have defined the recess.

* * * * *